United States Patent [19]
Gresch

[11] Patent Number: 5,096,719
[45] Date of Patent: Mar. 17, 1992

[54] PROCESS FOR JUICE EXTRACTION OF FRUITS AND VEGETABLES

[75] Inventor: Walter Gresch, Niederweningen, Switzerland

[73] Assignee: Bucher-Guyer AG Maschinenfabrik, Niederweningen, Switzerland

[21] Appl. No.: 204,427

[22] PCT Filed: Sep. 28, 1987

[86] PCT No.: PCT/CH87/00124
§ 371 Date: Jul. 12, 1988
§ 102(e) Date: Jul. 12, 1988

[87] PCT Pub. No.: WO88/02223
PCT Pub. Date: Apr. 7, 1988

[30] Foreign Application Priority Data
Sep. 25, 1986 [CH] Switzerland ............ 3893/86

[51] Int. Cl.⁵ .............................. A23L 2/02
[52] U.S. Cl. ............................ 426/51; 426/52; 426/63; 426/478; 426/489; 426/490; 426/495; 426/599; 426/615; 426/616
[58] Field of Search ........... 426/51, 52, 63, 599, 426/590, 615, 616, 478, 489, 490, 495

[56] References Cited

U.S. PATENT DOCUMENTS

| | | |
|---|---|---|
| 3,737,324 | 6/1973 | Zinchenko et al. |
| 4,299,849 | 11/1981 | Mouri et al. ............... 426/51 |
| 4,371,552 | 2/1983 | Posorske ................... 426/51 |

FOREIGN PATENT DOCUMENTS

2163062 2/1986 United Kingdom.

Primary Examiner—Donald E. Czaja
Assistant Examiner—J. Aberle
Attorney, Agent, or Firm—Edmund M. Jaskiewicz

[57] ABSTRACT

To extract the juice from fruits and vegetables, a process is used in which first the raw material is crushed in a mill (1) and then fed to a pulping machine (2) and a membrane filtration device (4). Before membrane filtration device (4), a liquefaction stage (3) is provided in which the raw material is liquefied enzymatically or physically only to the extent that a considerable portion of the mash can be run through membrane filtration device (4). The main breakdown of the cells occurs in the retentate of membrane filtration device (4) by a downstream device (5) for chemical or physical cell breakdown.

4 Claims, 1 Drawing Sheet

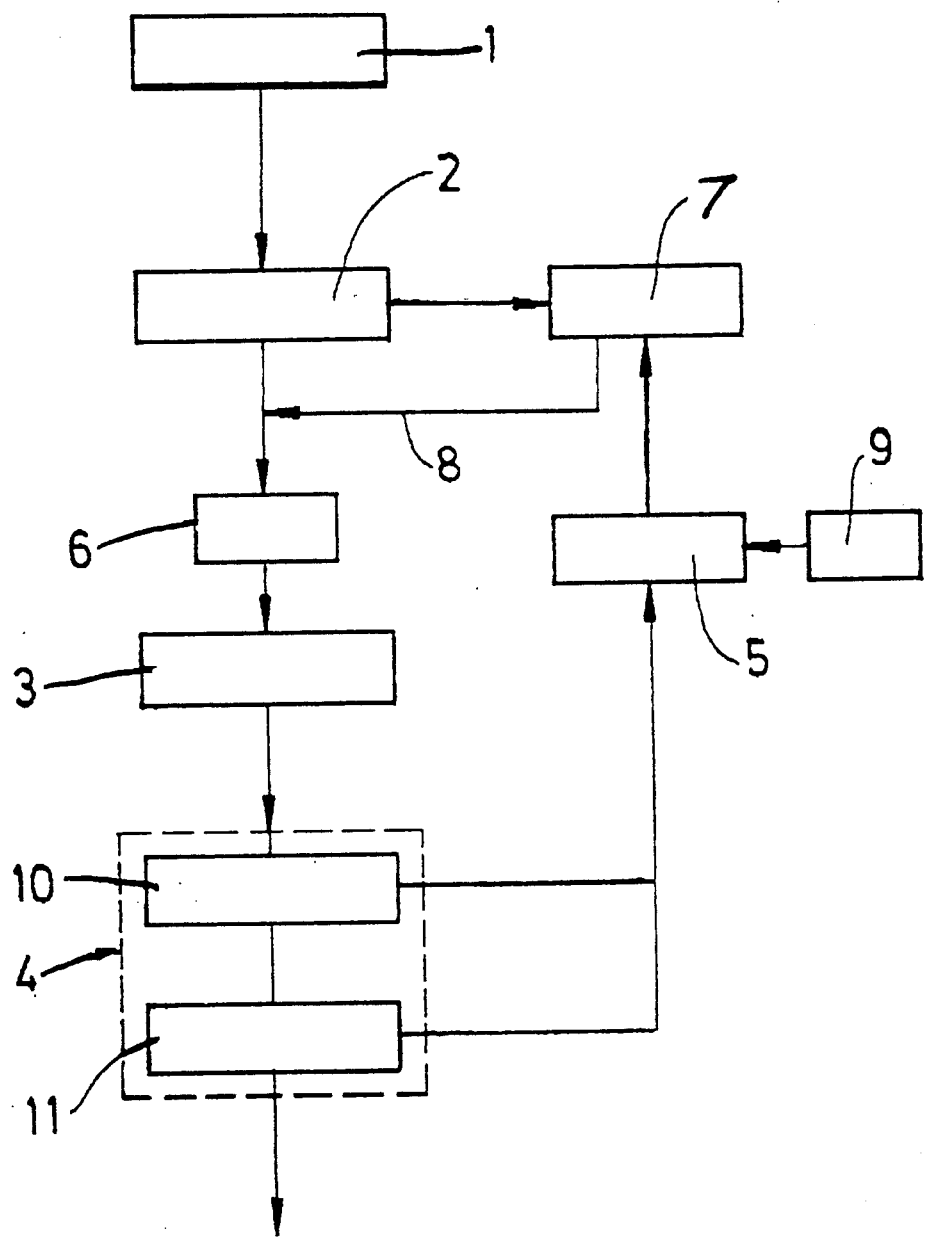

PROCESS FOR JUICE EXTRACTION OF FRUITS AND VEGETABLES

FIELD OF THE INVENTION

The invention relates to a process for treatment of fruits and vegetables, in particular for juice extraction, with devices for working up and liquefaction of the raw material and subsequent filtration.

DESCRIPTION OF THE RELATED ART

It is known from Japanese patent specification number 59-35580 to treat the mash located in a receptacle by enzymatic cell breakdown. The crushed fruit is mixed together with the added enzymes, e.g., cellulase, pectinase, with the aid of a stirring device and is liquefied by enzymatic cell breakdown. The liquid mixture obtained in this way runs through a pulping machine and is further fed to a sterilization device to deactivate the enzymes After that, the raw juice is fed to an ultrafiltration device and clarified.

The consumption of enzymes for liquefaction by enzymatic cell breakdown is relatively high in this known process, because the volume of the liquid mixture to be treated is very large at the beginning of the process. This means high operating costs for carrying out the process. Further, qualitative improvements are still desirable.

In addition there is also the possibility of performing the liquefaction of the raw material by physical cell breakdown. But the equipment required for this must, as a result of the large volume to be processed, be suitably large, which also leads to relatively high investment costs.

SUMMARY OF THE INVENTION

The object of the invention is thus to provide a process and an associated unit which avoid the drawbacks mentioned and contribute to cost reduction and quality improvement in juice extraction.

According to the invention, this object is achieved in that the liquefaction occurs by chemical, in particular enzymatic or physical, cell breakdown exclusively or mainly after filtration of the raw juice in the retentate.

Suitably, the clarification of the raw juice occurs by membrane filtration.

According to a further feature of the invention, the raw material can consist of whole fruit.

The unit for carrying out the process is characterized in that it consists of a device for crushing or blanching the fruit, a connected pulping machine and a membrane filtration device, downstream from which there is a device for the chemical, in particular enzymatic or physical, cell breakdown of the retentate.

If an additional advance liquefaction is required, another device for the enzymatic or physical cell breakdown can be upstream from, or integrated with, the membrane filtration device as the first liquefaction stage. By this measure it is to be achieved that, before membrane filtration, liquefaction is done enzymatically or physically only to the extent that a considerable portion of the liquefied mash can be run through the membrane filtration device.

According to a further feature of the invention, the membrane filtration device consists of an ultrafiltration or microfiltration device.

To improve the filtration yield, the membrane filtration device is configured in at least two stages, and the first stage serves for preclarification of the raw juice and the second or further stages are formed by the ultrafiltration or microfiltration unit. By this measure, the enzymatic or physical cell breakdown in the first liquefaction stage before the membrane filtration device can be eliminated in some cases. The result of this is a further saving in enzymes and a cost reduction, as well as an improvement in quality, since the enzyme activity occurs only during the second stage after membrane filtration and thus during a shorter retention time.

Suitably, the first stage of the membrane filtration device consists of a coarse filtration or microfiltration, or a dynamic crossflow filtration device struck by a tangential flow.

To improve the action in the first stage, this stage can be operated at higher pressure relative to the subsequent stages, for which ceramic or metallic filtration materials can be used in a simple way.

For more rational utilization of the raw material and to improve the yield, there is allocated to the pulping machine a recycling press, by which juice is extracted from the separated stems, seeds and parts of peels, etc.

To increase the yield of the unit and to dispose of the retentate treated by the device for the enzymatic or physical cell breakdown, the retentate can also be fed to the recycling press. The arrangement of the recycling press allows, with higher total yield, running of the membrane filtration device with only moderate yield, which leads to large cost savings. The possibility of running the membrane filtration device with low yield means that in certain cases the first liquefaction stage before the membrane filtration can be eliminated or at least greatly reduced.

To avoid subsequent clouding of the juice, especially by particles dissolved colloidally, macromolecules, e.g., polyphenols, and to improve the filtration ability of the retentate, a treatment stage is allocated to the device for the enzymatic or physical cell breakdown and in this treatment stage the retentate is treated with known fining agents and generally smaller amounts of enzymes before it is fed to the recycling press.

For the purpose of simple further processing, the raw juice extracted by the recycling press is again fed back into the course of the process by a feed pipe immediately after the pulping machine.

To reduce the viscosity of the crushed raw material and thus to improve the filtration yield and, in addition, depending on the breakdown process, to accelerate the physical cell breakdown to the extent that a liquefaction occurs before membrane filtration, there can be provided, between the pulping machine and the first liquefaction stage, a treatment stage with pectolytic enzymes that are allowed in practice. The enzyme treatment is also possible after the first liquefaction stage if only an improvement of the filtration yield is intended. In difficult cases, in addition to the physical cell breakdown, here there is also possible, to support the physical breakdown, an enzymatic cell breakdown by the addition of, for example, cellulase enzymes.

The advantages achieved with the invention can be seen especially in the fact that the enzymatic or physical treatment of the throughput amount occurs completely or mainly in a process section of the unit in which the volume of the throughput amount is already considerably reduced Since enzymes act solely as biochemical catalysts and thus do not enter into the reaction products, it is predominantly the enzyme concentration that determines the activity. Thus with concentrations similar to those in known processes, because of the lower volume in the process according to the invention, a considerable enzyme saving is achieved. If the treatment is not done enzymatically, but physically, then here also, because of the smaller volume, the equipment for the physical cell breakdown can be smaller and thus the investment costs can be reduced. In addition, the process according to the invention also achieves an improvement in the juice quality, because the retention time during enzymatic pretreatment is shorter or because a considerable juice portion is extracted in the filtration unit without, or only with weak, enzyme activity.

BRIEF DESCRIPTION OF THE DRAWINGS

The invention is described in further detail based on the following description and the diagrammatic drawing, which shows an embodiment of the unit for carrying out the process in a simplified block representation.

DESCRIPTION OF PREFERRED EMBODIMENT

The raw material from which juice is to be extracted and which, in the embodiment, consists of whole fruit, is crushed in a mill 1 and fed to a pulping machine 2. Instead of mill 1, the whole fruit can also be parboiled in a blanching machine before it is crushed in pulping machine 2.

From pulping machine 2, the raw material reaches a first liquefaction stage 3, in which it is pretreated by enzymatic or physical cell breakdown. Then the liquid mixture is conveyed to a membrane filtration device 4. In first liquefaction stage 3, the raw material is liquefied enzymatically or physically only to the extent that a considerable portion of the liquefied mash can be run through membrane filtration device 4. The yield at membrane filtration device 4 is preferably higher than about 65%. The retentate resulting from membrane filtration device 4 is fed to a device 5 for the enzymatic or physical cell breakdown. In device 5, which forms the second liquefaction stage, the main breakdown of the cells occurs for further liquefaction of the retentate.

Between pulping machine 2 and first liquefaction stage 3, a treatment stage 6 is provided in which enzymes such as, e.g., pectinase, and known fining agents, are fed to the raw material.

To pulping machine 2 there is allocated a recycling press 7, in which the juice is extracted from the stems, seeds and parts of peels resulting from pulping machine 2. As a recycling press, a horizontal press is best suited because of the good filtration action due to the long flow path for the juice. The raw juice extracted by recycling press 7 is again introduced into the course of the process by a pipe 8, preferably immediately after pulping machine 2.

Before the retentate from device 5 for the enzymatic or physical cell breakdown reaches recycling press 7, it is treated in a treatment stage 5 with enzymes and fining agents 9.

Membrane filtration device 4 is configured in two stages. First stage 10, in which the preclarification of the raw juice occurs, is formed by a coarse filtration or microfiltration device which are struck by a tangential flow and which operate at higher pressures, e.g., above 20 bars. The permeate of the first stage is fed to the second stage (10 bars), which consists of a standard ultrafiltration or microfiltration device 11. Instead of the coarse filtration or microfiltration device, in first stage 10 of membrane filtration device 4, a dynamic crossflow filtration device can advantageously be used. Here, it involves a pressure filtration device common in industry which operates dynamically by, for example, generating a so-called Taylor eddy flow, caused by a membrane drum rotating on the inside. By using such high-pressure devices in first stage 10 of membrane filtration device 4, liquefaction stage 3 before membrane filtration device 4 can be completely eliminated in some cases.

Instead of feeding the juice at recycling press 7 back into the process, the recycling juice can also be used separately. This results in two types of juices with different quality. The juice with a comparable high quality is removed directly from ultrafiltration or microfiltration device 11 and corresponds to conventional juice production, if work is done without liquefaction stage 3. The juice with lower quality is removed from recycling press 7 and can be used for the blending of juices, for example.

There is also an alternative to two-stage membrane filtration device 4 in which the mash from mill 1 is fed directly to first stage 10 of membrane filtration device 4, i.e., preferably to a dynamic crossflow filtration device. In this case, pulping machine 2 is superfluous. An improvement to this is still achieved by the addition of pectolytic enzymes together with the charging of fruit before the crushing. A further improvement is achieved in that the stems, seeds and peels in the retentate of the first stage of the membrane filtration device are separated by a revolving screen, a shaking screen or the like and are pressed by a recycling press (juice recovery). The recycling press can thus also be used for filtration of the retentate from the shaking screen, before the retentate, for example, is again fed back into the process.

I claim:

1. A process for the treatment of fruits and vegetables for juice extraction therefrom, the steps comprising pulping fruits or vegetables as raw material to obtain a liquefied mash, clarifying the liquefied mash by filtration to obtain a retentate having therein cells of raw material, and subjecting the retentate to an enzymatic or physical cell break down to produce a break down of at least a major portion of the cells of the raw material to produce liquefaction of the raw material.

2. Process according to claim 1 wherein the clarification of the liquefied mash occurs by membrane filtration.

3. Process according to claim 1 wherein the raw material consists of whole fruit.

4. Process according to claim 1 and the step of subjecting the liquefied mash to an initial enzymatic or physical cell break down only to the extent that a considerable portion of the liquefied mash is available for subsequent filtration.

* * * * *